(12) United States Patent
Anderson

(10) Patent No.: US 6,616,834 B2
(45) Date of Patent: Sep. 9, 2003

(54) WASTEWATER PROCESSOR

(76) Inventor: Jim Anderson, 635 Neuner Dr., Roseburg, OR (US) 97470

(*) Notice: Subject to any disclaimer, the term of this patent is extended or adjusted under 35 U.S.C. 154(b) by 0 days.

(21) Appl. No.: 09/977,523

(22) Filed: Oct. 14, 2001

(65) Prior Publication Data

US 2003/0070977 A1 Apr. 17, 2003

(51) Int. Cl.[7] ............... E03F 5/14; E03F 5/16; B01D 39/04; B01D 29/03; B01D 36/04
(52) U.S. Cl. ............ 210/155; 210/162; 210/170; 210/299; 210/300; 210/301; 210/335
(58) Field of Search ................. 210/155, 162, 210/170, 299, 300, 301, 335

(56) References Cited

U.S. PATENT DOCUMENTS

| | | | |
|---|---|---|---|
| 748,095 A | * | 12/1903 | Pfautz |
| 1,573,929 A | * | 2/1926 | Gall |
| 1,605,022 A | * | 11/1926 | Hapgool |
| 4,261,823 A | | 4/1981 | Gallagher et al. |
| 4,689,145 A | * | 8/1987 | Mathews et al. |
| 5,490,922 A | * | 2/1996 | Gresa |
| 5,707,527 A | | 1/1998 | Knutson et al. |
| 5,779,888 A | * | 7/1998 | Bennett |
| 6,080,307 A | | 6/2000 | Morris et al. |
| 6,080,308 A | | 6/2000 | Williamsson |
| 6,096,200 A | * | 8/2000 | Bennett |
| 6,190,545 B1 | * | 2/2001 | Williamson |

FOREIGN PATENT DOCUMENTS

WO      94/17896    * 8/1994

* cited by examiner

Primary Examiner—Thomas M. Lithgow
(74) Attorney, Agent, or Firm—Carl D. Crowell

(57) ABSTRACT

A wastewater treatment apparatus comprised of a water inlet 10, a filter component comprised of a series of filters 20, 30, 40 and settling ing areas 12, 22, 32 over a grade, and a series of separator tanks, 42, 52 connected by a lift tube 54 for removal of hydrocarbons, particulate material and other impurities and a water outlet for discharge into either a general wastewater system or a gray water reclamation system.

9 Claims, 2 Drawing Sheets

WASTEWATER PROCESSOR

FIELD OF THE INVENTION

This invention relates wastewater treatment systems in particular systems and methods for dealing with wastewater runoff which may contain hydrocarbons such as may be found in a car wash, or auto fueling area.

BACKGROUND OF THE INVENTION

Wastewater treatment is a well-known area and there are numerous systems for treating area runoff including such systems as U.S. Pat. Nos. 5,707,527 and 6,080,307. These systems are designed to work with large scale centralized storm water drain systems or are complex highly mechanized systems which are cost prohibitive and require regular maintenance.

However, there are many instances where hydrocarbon accumulation is highly localized. Such locations may consist of a limited area water impermeable surface that receives occasional hydrocarbon contamination. Areas such as auto fueling stations and car wash areas produce localized concentrations of runoff that should be treated prior to discharge into a general wastewater system or gray water reclamation system. Often there are regulations by local and regional governmental bodies that require local and private treatment of water runoff.

The present invention meets the need to provide a device for treating localized contaminated runoff. The device provides an inexpensive, low maintenance and versatile method and device for treating contaminated runoff, which is easily installed to service new development, and existing locations.

SUMMARY OF THE INVENTION

The invention provides an apparatus and treatment method for wastewater runoff to remove hydrocarbons and other contaminants from wastewater prior to discharge into a general wastewater system. The invention may also be adapted to treat wastewater for collection as gray water for reuse. The invention consists of a self-contained canister with a water inlet disposed on one side, and a series of vertical hydrophobic filter units through which the water must pass. The invention is also adaptable to be placed in series with pre-chamber settling or storage tank to collect sudden large volume accumulation and avoid exceeding unit capacity.

In the preferred embodiment, preceding the first filter unit is a settling area to reduce turbidity and allow larger particles to settle prior to impacting the first filter. Following thereafter are a series of vertical filters. Between each vertical filter are additional settling areas. In the preferred embodiment there are at least three vertical filters for collection of hydrocarbons and particulate material.

While there are advantages to multiple grades and types of filter material, economics and ease of maintenance and use often calls for a single coarser material to be used in series. Over time the first filer unit will reach filtering capacity and become effectively plugged. When the first filter reaches capacity, water in the first settling area will overflow and be filtered by the second filter unit, reducing the over all effectiveness of the invention, but still leaving processed water in an acceptable condition for discharge or reuse.

In the preferred embodiment, the series of filer units are placed on a grade of 2% or more to give the water a natural flow from the water inlet through the filter units.

After the last filter unit, a separator disposed so as to permit heavy non-filtered contaminants to settle and light non-filtered contaminants to collect on the surface of the water. Contaminants are removed from the separator with the regular filter maintenance of the unit in addition to processes such as natural breakdown and evaporation.

The separator is comprised of a first separator tank disposed to contain a significant volume of water below the level of the last filter. This serves a number of purposes. As the tank drains, the filter units are exposed to air and allowed to dry, extending their life. This lower reservoir is also used to collect additional particulate matter and to provide a water substrate for oil to collect and be kept above a lift tube that drains this reservoir into the final separator tank.

The lift tube is placed in the separator tank so as to be below the surface of the water level and to collect the water and lift it via siphon or pump into the second separator tank for a final settling. In the preferred embodiment, a float type switch activates the pump. The lift tube discharges the water from the first separator tank into the second reservoir in a manner that prevents excessive agitation of the water in the second separator tank, and in the preferred embodiment, as a sprayed sheet along one of the walls in the second separator tank.

An outlet is located medially in a wall of the second separator tank. In the preferred embodiment, water is neither drained off the top, nor the bottom of this tank. This permits settled matter to remain undisturbed on the bottom of the tank and to permit further hydrocarbon accumulation on the surface of the water. The water outlet then drains to a general wastewater system or a gray water reclamation system for reuse.

In normal use, the filter units will become clogged over time depending on the volume of water processed and the amount of contamination. The simple layout of the device provides for easy regular access to the filters for maintenance.

The entire device is accessible through the top of the unit and necessary maintenance is quickly accomplished. Filter units may be replaced in whole, or they may be left with open or removable tops to permit the contents to be vacuumed out and refilled with loose filter medium. A simple vacuum sweep with or without accompanying wash of the settling tanks and the reservoirs removes any build up of contamination.

There are many filter materials available of varying degrees of utility. In the preferred embodiment, a basic cellulose pulp is used, as it is a cheap and plentiful byproduct of the timber industry. When the filter medium is fully exhausted, cellulose pulp is easily vacuumed and in high demand as a fuel for co-generation waste incinerators, burning relatively cleanly.

The open nature of the device permits use of multiple filter mediums in whole or series. The devise is readily adaptable to accommodate inexpensive loose cellulose filter material in one or more of the first filers and a carbon or charcoal medium in one of the later filters. Use of a carbon or similar medium in a later stage filer aids in the removal of odors and silicon wax based contaminants which are common in many car washes.

Other options include using bagged filter material that may be placed in the filter canisters and sheet filter material inserted into the canisters or even between canisters. Bags of filter material may either be such that a single bag is placed in each canister or multiple bags may be placed in a single canister. This permits less expensive material to be exhausted rapidly in the earlier filters, and still provides filtering with more expensive though more specific filter mediums in a later stage.

The device also permits the change of the filter mediums to fit the needs of a location that may experience specific contamination depending on the season. Wintertime loads in many areas have distinct contamination components that may not be present during warmer months permitting insertion of a specific filter medium to isolate and collect these contaminants.

BRIEF DESCRIPTIONS OF THE DRAWINGS

The drawings relate to multiple aspects of the invention.

DETAILED DESCRIPTION OF THE DRAWINGS

Figure 1:
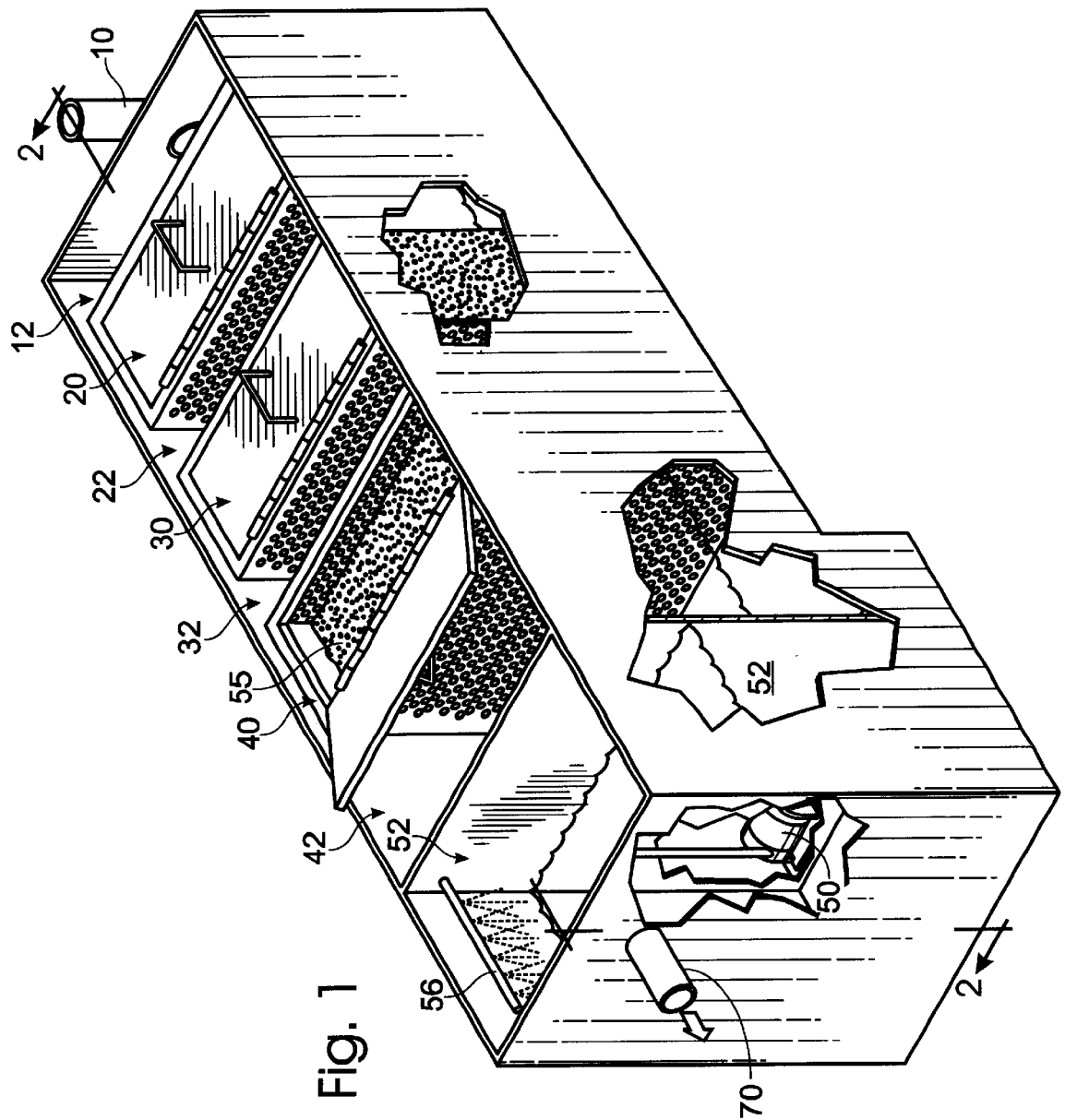
FIG. 1 is on open top perspective view of an embodiment of the invention.
Figure 2:
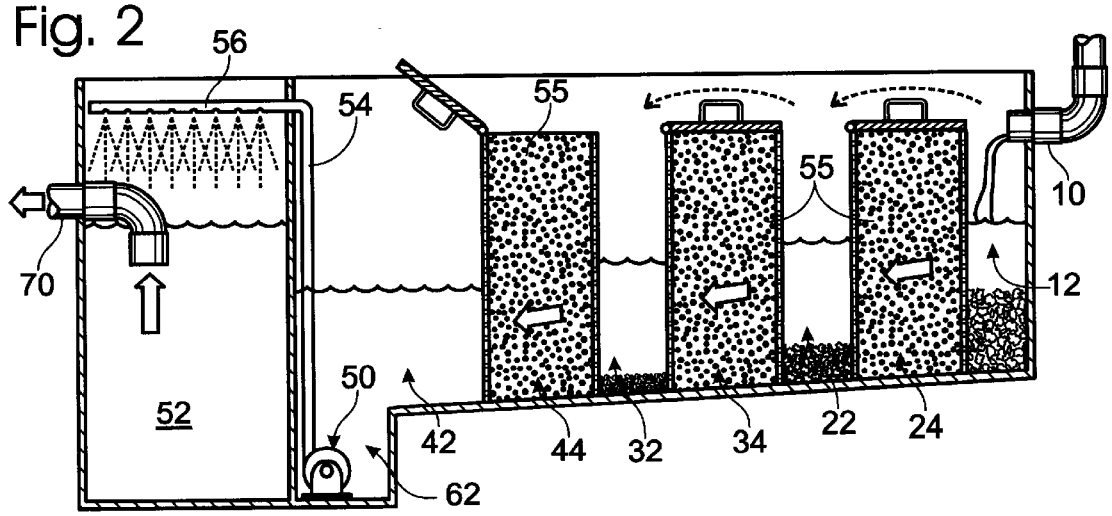
FIG. 2 is a cross sectional view of the device depicted in FIG. 1.

FIG. 1 shows an embodiment of the invention in perspective. For illustrative purposes the lid of the invention (not shown) has been removed. The same device is depicted in FIG. 2 as a cross sectional view along the plane 2 indicated in FIG. 1. In operation wastewater enters the device at the water inlet 10 from any number collection means, including directly from hard surface runoff such as a parking lot, or from a pre-filter collection basin (not shown). Wastewater is first processed by the filter component of the invention which is comprised of a series of filter canisters 20, 30 40 and settling areas, 12, 22, 32. Water is collected in the first settling area 12 and passes through the first filter canister 20. Water is then collected and settled in the second settling area 22 before passing through the second filter canister 30. Water is then collected and settled in the third settling area 32 before passing through the third filter canister 40 and then into a separator comprised of a first separator tank 42 and a second separator tank 53.

Each filter canister 20, 30, 40 is comprised of a flow through screen material which permits ready transmission of water and retains the filter medium 55. In the device depicted in FIG. 1, the filter canisters are fitted with lids to permit access to the filter material 55. This permits the filter material to be readily removed by a means such as vacuuming.

Figure 3:
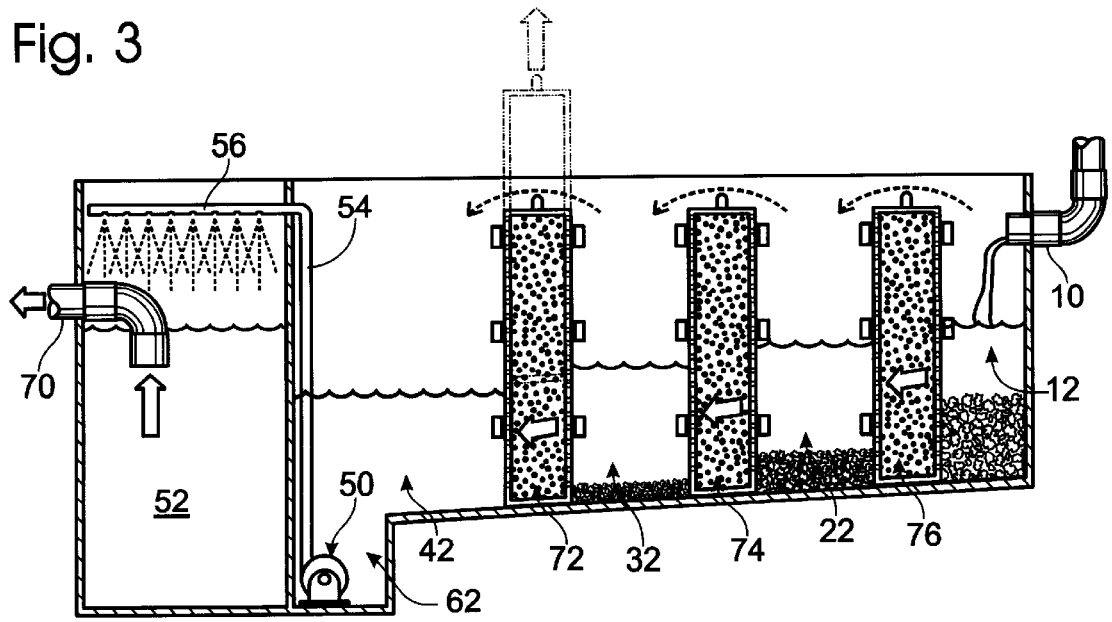
FIG. 3 is an alternate embodiment of the invention.

An alternate embodiment depicted in FIG. 3 is essentially the device of FIGS. 1 and 2 with removable filter canisters 72, 74, 76. This permits the removal of the entire canister for off-site refilling or processing and in certain conditions may be a more favorable method of servicing the invention.

The first separator tank 42 is disposed so as to have a reservoir 62 located below the level of the filter canisters. Located in this reservoir 62 is a pump 50 connected to a lift tube 54 for pumping the treated water from the first separator tank 42 into a second separator tank 52. The pump 50 is fitted with a float type switch (not shown) which maintains water in the reservoir 62 to collect contaminants, but permits the filter canisters 20, 30, 40 to be drained and allowed to dry.

Water is pumped from the first separator tank 42 and lifted via the lift tube 54 and discharged into the second separator tank 52 along one side wall by a sprayer 56 in a pattern that minimizes turbulence.

Water is drained via a water outlet 70 from the second separator tank 52. The water outlet 70 is located so as to drain the second separator tank 52 medially, neither draining surface water that may accumulate waste material, nor collecting water from the bottom of the tank which may collect sediment. This easily accomplished in the preferred embodiment through the use of a downward elbowed water outlet 70 adapted so as to prevent siphoning.

Processed water may then be discharged into either a gray water storage tank for reuse, or into a general sewage system without concerns about excess contaminants.

The device as depicted is designed to be used to process wastewater runoff and specifically adapted to process hard surface wastewater runoff. Numerous modifications are readily apparent to those skilled in the art and the depicted embodiment is not intended to limit the scope of the invention. The general arrangement of the preferred embodiment should be used for illustrative purposes only. Accordingly, the scope of the invention is limited only by the claims as set forth.

I claim:

1. A waste water treatment apparatus comprised of, a water inlet, a filter component, said filter component disposed on an incline, disposed in series with said filter component is a separator, connected to said separator is a water outlet, wherein said filter component is comprised of, a first settling area, a first filter, a second settling area, a second filter, a third settling area and a third filter wherein said first filter, said second filter and said third filter are each comprised of screen sided canisters containing a filter medium.

2. The apparatus of claim 1 wherein said screen sided canisters each have a removable lid section.

3. The apparatus of claim 2 wherein said first filter, said second filter and said third filter are each removable.

4. The apparatus of claim 1 wherein said filter medium is comprised of cellulose.

5. The apparatus of claim 1 wherein said separator is comprised of a first separator tank connected by a connecting means in series to a second separator tank, said second separator tank comprised of four walls, and a bottom.

6. The apparatus of claim 5 wherein said connecting means comprises a pump connected to a lift tube placed in said first separator tank for draining said first separator tank into said second separator tank.

7. The apparatus of claim 6 wherein said lift tube drains into said second separator tank by a means of discharging against a side of said second separator tank.

8. The apparatus of claim 5 wherein said water outlet is medially disposed on a wall of said second separator tank.

9. A method of treating wastewater runoff, the method comprising:

allowing water to enter into an filter component comprised of a series of filter units interspersed with settling areas along a gradient; and allowing the water to drain down said gradient through said series of filter units and said settling areas; and allowing the water to collect in a first separator tank; and pumping the water from the bottom of said first separator tank; and dispersing the water into a second separator tank; and allowing the water to drain medially out of said second separator tank through a water outlet.

\* \* \* \* \*